(12) United States Patent
Zhang et al.

(10) Patent No.: US 9,717,133 B2
(45) Date of Patent: Jul. 25, 2017

(54) WIRELESS LED DRIVER (71) Applicant: Silergy Semiconductor Technology (Hangzhou) LTD, Hangzhou, ZheJiang Province (CN)

(72) Inventors: Wang Zhang, Hangzhou (CN); Wei Chen, Saratoga, CA (US); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/341,235

(22) Filed: Nov. 2, 2016

(65) Prior Publication Data
US 2017/0135187 A1 May 11, 2017

(30) Foreign Application Priority Data
Nov. 6, 2015 (CN) .......................... 2015 1 0753032

(51) Int. Cl.
*H05B 37/02* (2006.01)
*H05B 33/08* (2006.01)

(52) U.S. Cl.
CPC ..... *H05B 37/0272* (2013.01); *H05B 33/0812* (2013.01); *H05B 33/0815* (2013.01); *H05B 33/0845* (2013.01)

(58) Field of Classification Search
CPC ............ H05B 33/0815; H05B 33/0803; H05B 33/0848; H05B 37/0272; H05B 37/0227; Y02B 20/346; H04H 20/71; H01F 38/14; H02J 50/10; H02J 50/40; H02J 50/80
USPC .... 315/291, 247, 278, 209 R, 224, 307, 360
See application file for complete search history.

(56) References Cited

U.S. PATENT DOCUMENTS

| | | | |
|---|---|---|---|
| 7,346,332 B2* | 3/2008 | McCarty | H04B 3/54 340/12.3 |
| 8,773,047 B2 | 7/2014 | Chen | |
| 8,994,276 B2* | 3/2015 | Recker | H02J 9/02 315/160 |
| 9,131,562 B2 | 9/2015 | Chen | |
| 9,295,143 B1* | 3/2016 | Xiong | H05B 33/0815 |
| 2015/0061503 A1 | 3/2015 | Billard et al. | |
| 2015/0373796 A1* | 12/2015 | Bahrehmand | H05B 33/0815 315/129 |
| 2016/0227631 A1 | 8/2016 | Weedon, III et al. | |
| 2017/0048937 A1* | 2/2017 | Wang | H01F 38/14 |

* cited by examiner

Primary Examiner — Haissa Philogene
(74) Attorney, Agent, or Firm — Michael C. Stephens, Jr.

(57) ABSTRACT

A wireless LED driver can include: an electrical energy transmitter comprising an inverter circuit coupled to receive an input power supply, and being configured to convert a received voltage signal to an AC signal; the electrical energy transmitter comprising N transmitter coupling circuits coupled to the inverter circuit, and being configured to be driven by the AC signal; an electrical energy receiver comprising M receiver coupling circuits coupled to the transmitter coupling circuits in a contactless mode, and being configured to receive the AC signal; and the electrical energy receiver comprising M rectifier circuits coupled to the receiver coupling circuits one by one, where each the rectifier circuit is configured to convert the AC signal to a DC signal to drive an LED load coupled to output terminals of the rectifier circuit, and where N and M are integers not less than 1.

17 Claims, 7 Drawing Sheets

WIRELESS LED DRIVER

RELATED APPLICATIONS

This application claims the benefit of Chinese Patent Application No. 201510753032.3, filed on Nov. 6, 2015, which is incorporated herein by reference in its entirety.

FIELD OF THE INVENTION

The present disclosure generally relates to the field of power electronics technology, and more particularly to wireless light-emitting diode (LED) drivers.

BACKGROUND

Wireless power supply is a convenient and safe new technology through which electrical energy can be transferred to a load wirelessly without any physical connections, and within a close distance. As compared with conventional power supplies, a wireless power supply structure can provide several advantages, such as being frictionless to be easily maintained due to the non-contact between the power supply system and the load, noiseless and free from pollution due to the non-limit by the speed of the load, adaption to various poor conditions (e.g., underwater, snow and ice weather, underground, etc.), and lower volume due to the higher operation frequency. Wireless power supplies have been applied in battery charging fields, and to drive a single load.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a wireless light-emitting diode (LED) driver, can include: (i) an electrical energy transmitter comprising an inverter circuit coupled to receive an input power supply, and being configured to convert a received voltage signal to an AC signal; (ii) the electrical energy transmitter comprising N transmitter coupling circuits coupled to the inverter circuit, and being configured to be driven by the AC signal; (iii) an electrical energy receiver comprising M receiver coupling circuits coupled to the transmitter coupling circuits in a contactless mode, and being configured to receive the AC signal; and (iv) the electrical energy receiver comprising M rectifier circuits coupled to the receiver coupling circuits one by one, where each the rectifier circuit is configured to convert the AC signal to a DC signal to drive an LED load coupled to output terminals of the rectifier circuit, and where N and M are integers not less than 1.

Figure 1A:
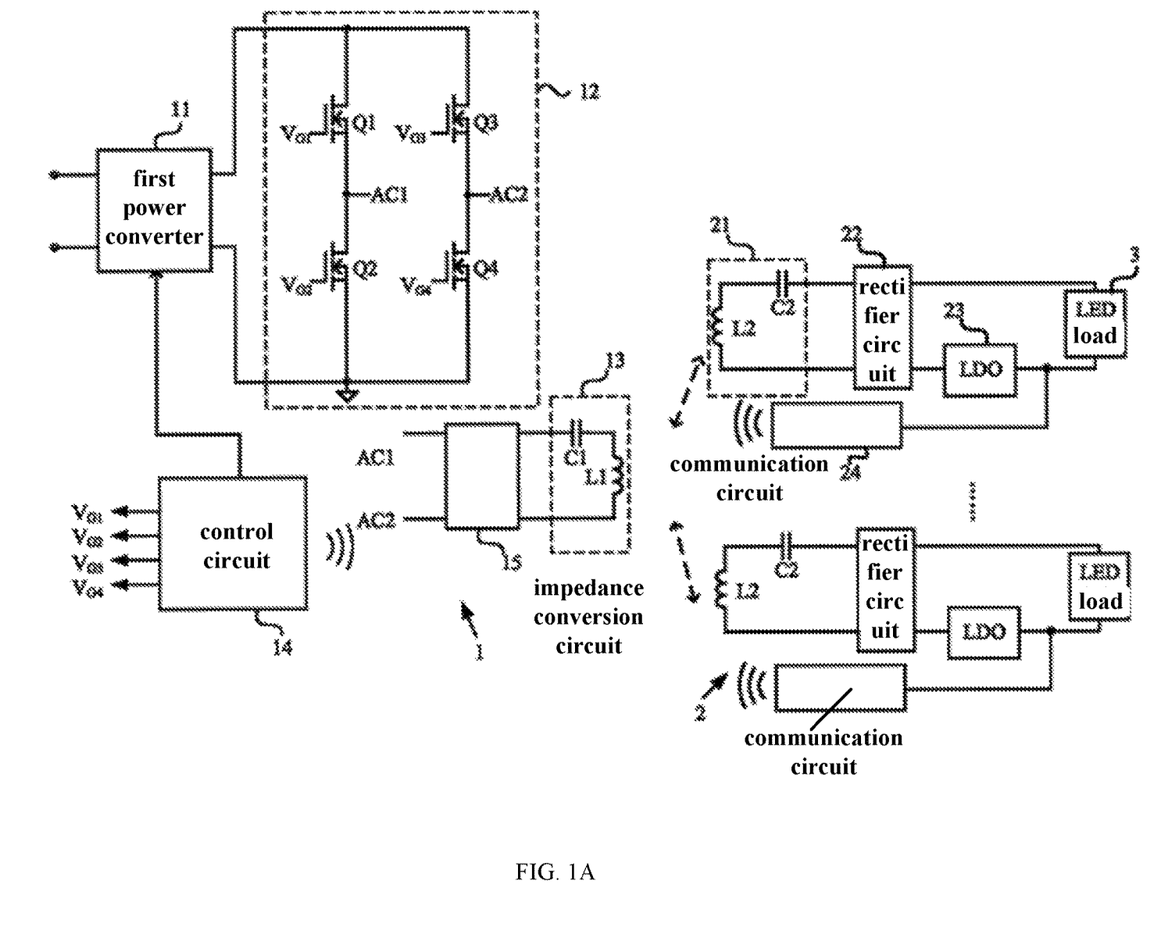
FIG. 1A is a schematic block diagram of a first example wireless LED driver, in accordance with embodiments of the present invention.

Referring now to FIG. 1A, shown is a schematic block diagram of a first example wireless LED driver, in accordance with embodiments of the present invention. In this particular example, the wireless LED driver can include electrical energy transmitter 1, and at least one electrical energy receiver 2. For example, electrical energy receiver 2 can be coupled to electrical energy transmitter 1 wirelessly and contactlessly, in order to receive electrical energy from transmitter 1 to drive LED load 3 connected to electrical energy receiver 2. Receiver 2 and LED load 3 can be integrated (e.g., arranged on one printed-circuit board [PCB] board, encapsulated in one housing, etc.).

Transmitter 1 can include power converter 11, inverter circuit 12, N transmitter coupling circuits 13, and controller circuit 14. For example, N is an integer not less than 1, and is 1 in this case as shown. Power converter 11 can be a DC-DC converter to control the power input to inverter circuit 12. Inverter circuit 12 can be full bridge circuit or half bridge circuit including output terminals AC1 and AC2. In this example, inverter circuit 12 is configured as a full bridge circuit including four switches, Q1-Q4.

Transmitter coupling circuit 13 can include transmitting coil L1, which can be coupled to the coil of receiver 2 in a contactless mode. For example, transmitter coupling circuit 13 can be coupled to receiver 2 by an electromagnetic mode (e.g., consistent with the Qi standard) or a magnetic resonance mode (e.g., consistent with the A4WP standard). To improve the efficiency of transmitter 1, transmitting capacitor C1 can be coupled in series with, or parallel to, transmitting coil L1. Impedance matching may be achieved to improve the electrical energy transmitting efficiency by transmitting capacitor C1 as an impedance matching circuit.

Also, distributive capacitor (e.g., the distributive capacitor of wires of transmitting coil L1) can be configured as transmitting capacitor C1, so no independent capacitor need be employed in the system. For example, transmitter 1 can also include impedance conversion network 15 coupled between inverter circuit 12 and transmitter coupling circuit 13 to achieve impedance conversion. Therefore, the output current may only be related to the input voltage to facilitate the control operation. Further, impedance conversion network 15 can provide necessary impedance matching.

Figure 1B:
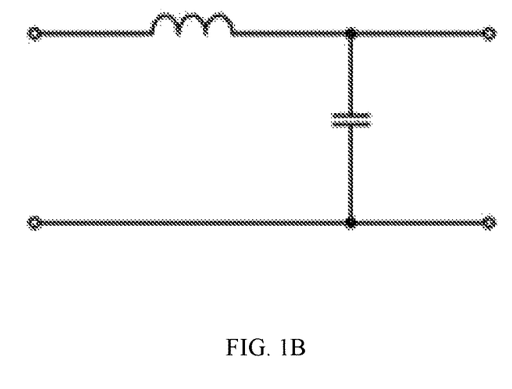
FIG. 1B is a schematic block diagram of an example equivalent resistance conversion network of the wireless LED driver, in accordance with embodiments of the present invention.
Figure 1C:
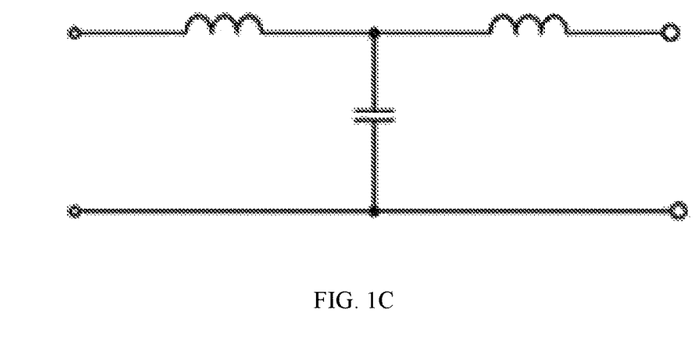
FIG. 1C is a schematic block diagram of another example equivalent resistance conversion network of the wireless LED driver, in accordance with embodiments of the present invention.

Referring now to FIGS. 1B and 1C, shown are schematic block diagrams of example equivalent resistance conversion networks of the wireless LED driver, in accordance with embodiments of the present invention. Here, impedance conversion network 15 is a 2 port network (e.g., LC 2 port network model or T type LC network model). Controller circuit 14 can generate control signals VG1-VG4 to control inverter circuit 12. Controller circuit 14 can regulate power converter 11 or inverter circuit 12, in order to modulate the power input to transmitter coupling circuit 13 in accordance with a feedback signal received by short distance wireless communication protocols (e.g., Bluetooth protocol, infrared communication protocol, etc.) from receiver 2. Therefore, power provided to LED load 3 may be controlled.

Each receiver 2 can be coupled to transmitter 1 simultaneously to receive electrical energy to drive LED load 3. Each receiver 2 can include receiver coupling circuit 21, rectifier circuit 22, power converter 23, and communication circuit 24. Receiver coupling circuit 21 can be coupled to transmitter coupling circuit 13 in a contactless mode (e.g., electromagnetic induction, resonance mode, etc.) to generate AC current of higher frequency based on the received electrical energy.

For example, receiver coupling circuit 21 can include receiving coil L2 coupled to transmitting coil L1, in order to transfer electrical energy in a contactless mode. To improve the impedance matching performance with a post stage circuit, receiving capacitor C2 can be coupled in series or in parallel with receiving coil L2 in receiver coupling circuit 21. Similarly, a distributive capacitor (e.g., the distributive capacitor of wires of receiving coil L2) can be configured as receiving capacitor C2. Other types of impedance matching circuits can alternatively be added in receiver coupling circuit 21. Rectifier circuit 22 can be coupled to receiver coupling circuit 21, in order to convert received AC current of receiver coupling circuit 21 to DC current.

Power converter 23 can be coupled between rectifier circuit 22 and LED load 3 to achieve DC to DC conversion, which can be configured as switching power converters or linear regulators. In this example, the linear regulator may provide constant current to LED load 3. In FIG. 1A, when the received electrical energy is changed, the voltage of power converter 23 can also be changed. Therefore, voltage of power converter 23 can be configured as the feedback signal representing a voltage of LED load 3.

Communication circuit 24 may transfer the information of the feedback signal to transmitter 1 based on a short distance wireless communication protocol (e.g., Bluetooth protocol, infrared communication protocol, etc.). When the amount of receiver coupling circuits is greater than 1 (e.g., two receiver coupling circuits in FIG. 1A), the first power converter (e.g., 11) or the inverter circuit can be controlled by control circuit 14 in accordance with the output voltage of the constant current power converter such that the minimum value of the output voltages is higher than a predetermined threshold voltage.

One transmitter coupling circuit can be coupled to a plurality of receiver coupling circuits, in order to achieve wireless power supply. Due to the difference of degrees of coupling, the power transferred to receiver coupling circuits may be different. However, by the control of power converter 11 and/or inverter circuit 12, the minimum voltage of LED load 3 can be controlled to be no less than a predetermined voltage such that all LED loads 3 are operated normally. In particular embodiments, constant current can be generated by power converter 23 of the receiving side to drive LED load 3, and the voltage of LED load 3 can be controlled by regulating the output power of transmitting side. In this way, LED load(s) 3 can be controlled to be normally operated.

Figure 2A:
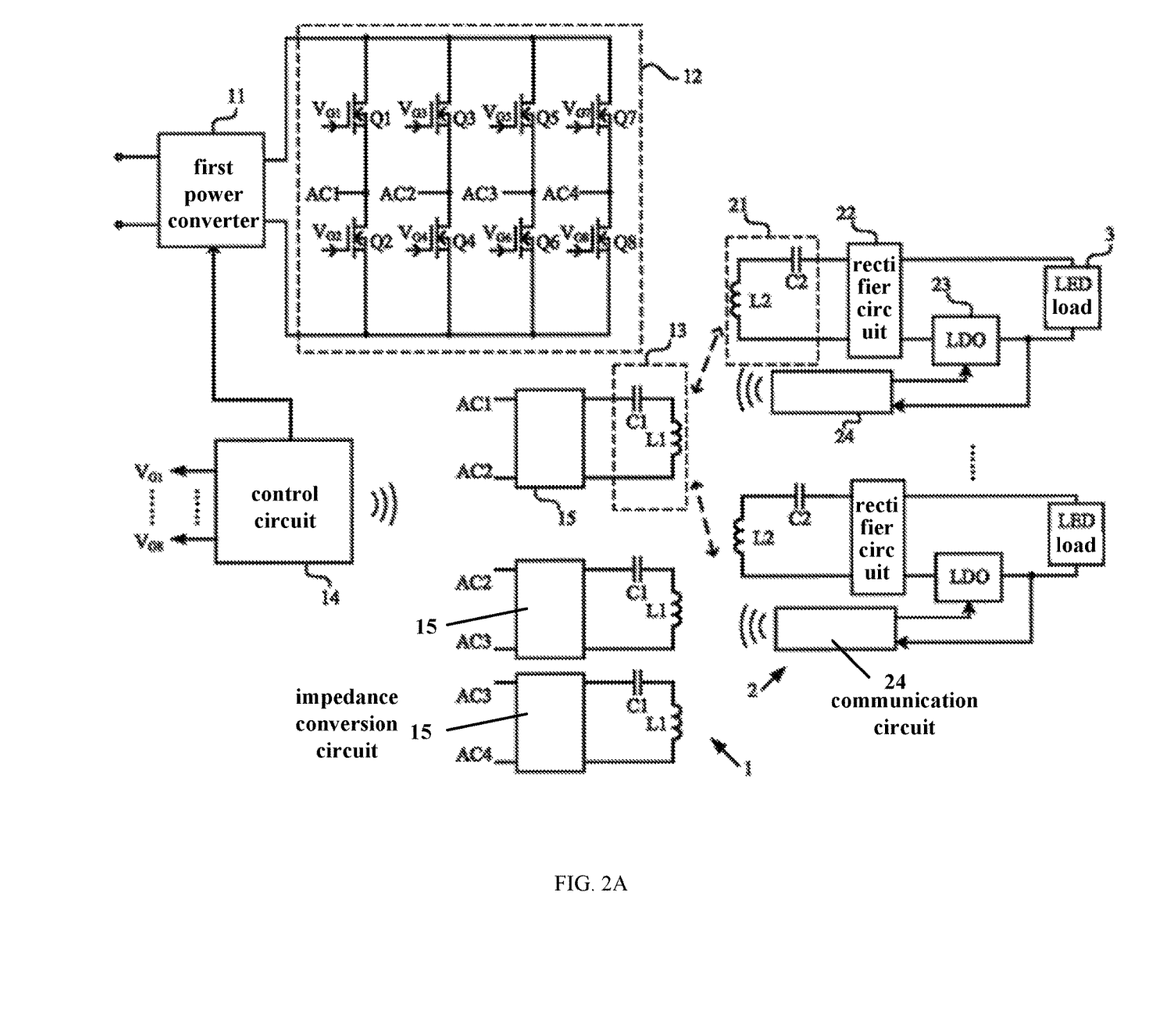
FIG. 2A is a schematic block diagram of a second example wireless LED driver, in accordance with embodiments of the present invention.

Referring now to FIG. 2A, shown is a schematic block diagram of a second example wireless LED driver, in accordance with embodiments of the present invention. In this particular example, the wireless LED driver can include electrical energy transmitter 1 and at least one electrical energy receiver 2, which are coupled in a contactless mode. Also, LED load(s) 3 can be coupled to electrical energy receiver 2. Electrical energy can be received from transmitter 1 to drive LED load 3. Receiver 2 can be integrated with LED load 3 (e.g., arranged on one PCB board), and encapsulated in one housing.

Transmitter 1 can include power converter 11, inverter circuit 12, N transmitter coupling circuits 13, and control circuit 14. For example, N can be an integer larger than 1, and in this example, N is equal to 3 as shown in FIG. 2A. Also for example, power converter 11 can be configured as a DC-DC converter to control power input to inverter circuit 12. Inverter circuit 12 can include three groups of output ports to drive three transmitter coupling circuits 13. Inverter circuit 12 can be configured by three independent full bridge or half bridge circuits, in order to achieve independent three groups of output ports. Switches of independent full bridge or half bridge circuits of inverter circuit 12 can be controlled by control circuit 14 to output high frequency AC current from the three groups of output ports to drive transmitter coupling circuits 13.

For example, inverter circuit 12 can include (N+1) half bridge circuits, and output terminals of $i^{th}$ and $(i+1)^{th}$ half bridge circuits may be configured as the $i^{th}$ group of output port of inverter circuit 12, where i=1.2.3 . . . N. In the example of FIG. 2A, inverter circuit 12 can include 4 half bridge circuits including 8 switches Q1-Q8. In addition, first and second half bridge circuits may form a full bridge circuit to output high frequency AC current to drive first transmitter coupling circuit 13 through output ports AC1 and AC2. Also, second and third half bridge circuits may form a full bridge circuit to output high frequency AC current to drive second transmitter coupling circuit 13 through output ports AC2 and AC3. Further, third and fourth half bridge circuits can form a full bridge circuit to output high frequency AC current to drive third transmitter coupling circuit 13 through output ports AC3 and AC4. Transmitter coupling circuits 13 can be driven to be operated in turn by control of the working sequence of switches Q1-Q8 of inverter circuit 12 through control signals VG1-VG8 by control circuit 14.

Figure 2B:
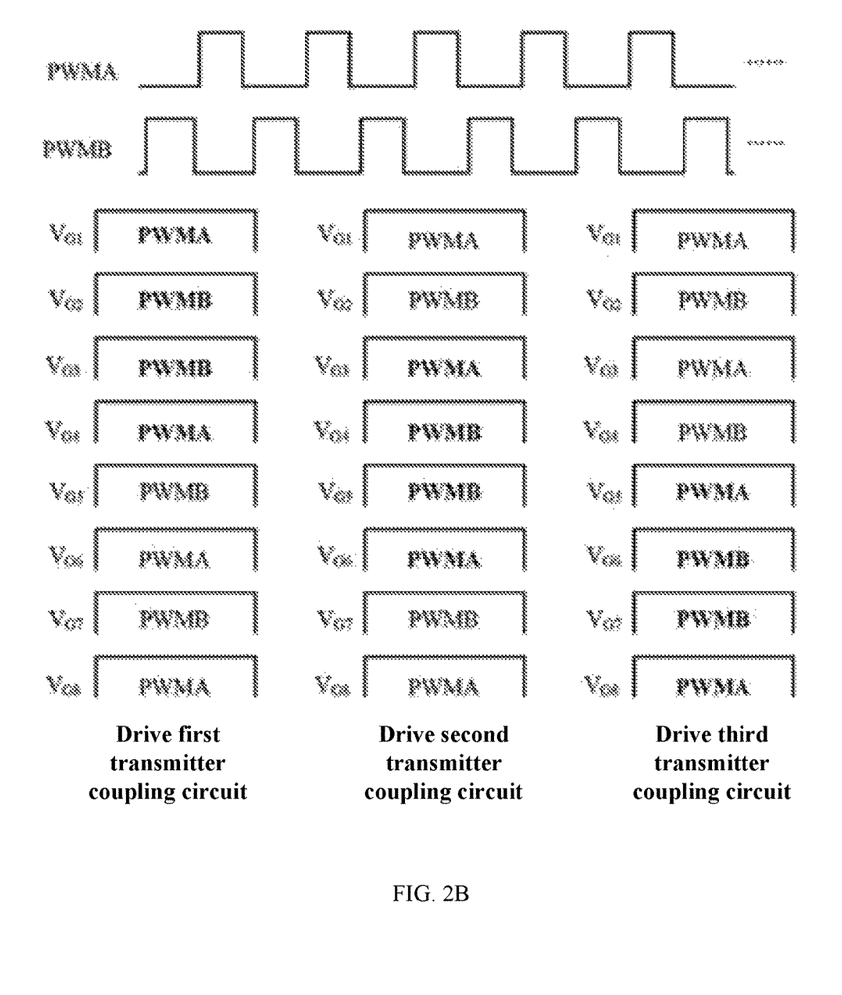
FIG. 2B is a waveform diagram of example driving signals for switches of the inverter circuit, in accordance with embodiments of the present invention.

Referring now to FIG. 2B, shown is a waveform diagram of example driving signals for switches of the inverter circuit, in accordance with embodiments of the present invention. PWM signals PWMA and PWMB can be complementary PWM signals, which can include dead time or not. In this particular example, due to the existence of dead time, after a time interval that the first switch of half bridge circuit is turned off, the second switch is turned on, or after a time interval that the second switch of half bridge circuit is turned off, the first switch is turned on. Therefore, potential failure or fault of power switches can be avoided. In the dead time interval, both first and second switches can be controlled to be turned off by two different PWM signals. In this example, switches Q1-Q8 can be controlled separately by a corresponding one of control signals VG1-VG8. For example, the control signal can be a voltage signal between control terminal and one power terminal of lower voltage of the power switch.

To drive transmitter coupling circuit 13, control signals $V_{G1}$ and $V_{G4}$ can be configured as PWM signal PWMA to control the operation of power switches Q1 and Q4. Also, control signals $V_{G2}$ and $V_{G3}$ can be configured as PWM signal PWMB to control the operation of power switch Q2 and Q3. Power switches Q1-Q4 of the first and second half bridge circuits may form a full bridge inverter circuit to convert a DC current at the input terminals to an AC current at output ports AC1 and AC2 to drive transmitter coupling circuit 13. In addition, and possibly simultaneously, power switches Q5 and Q7 of the third and fourth half bridge circuits may be controlled by PWM signal PWMB, and power switches Q6 and Q8 can be controlled by PWM signal PWMA. Power switches Q5 and Q7 can be controlled to be simultaneously turned on or off, and power switches Q6 and Q8 may be controlled to be simultaneously turned on or off. Therefore, no AC current may be output from the second and third half bridge circuits, and from third and fourth half bridge circuits. Also, AC current can only be generated at the output ports AC1 and AC2 of inverter circuit 12 by control circuit 14 to drive the first transmitter coupling circuit.

Control signals $V_{G3}$ and $V_{G6}$ can be configured as PWM signal PWMA to control the operation of power switch Q3 and Q6, and control signals $V_{G4}$ and $V_{G5}$ may be configured as PWM signal PWMB to control the operation of power switch Q4 and Q5. Power switches Q3-Q6 of the second and third half bridge circuits may form a full bridge inverter circuit to convert a DC current at the input terminals to an AC current at output ports AC2 and AC3 to drive transmitter coupling circuit 13. Substantially simultaneously, power switch Q1 can be controlled by PWM signal PWMA, and power switch Q2 can be controlled by PWM signal PWMB. Power switches Q1 and Q3 can be controlled to be simultaneously turned on or off, and power switches Q2 and Q4 are controlled to be simultaneously turned on or off. Therefore, no AC current may be output from first half bridge circuit and second half bridge circuit. Similarly, power switches Q8 can be controlled by PWM signal PWMA, and power switches Q7 may be controlled by PWM signal PWMB. Power switches Q1 and Q7 can be controlled to be simultaneously turned on or off, and power switches Q2 and Q8 may be controlled to be simultaneously turned on or off. Therefore, no AC current may be output from the third and fourth half bridge circuits. Also, AC current may only be generated at the output ports AC2 and AC3 of inverter circuit 12 by control circuit 14 to drive the second transmitter coupling circuit.

Control signals $V_{G5}$ and $V_{G8}$ can be configured as PWM signal PWMA to control the operation of power switches Q5 and Q8. Also, control signals $V_{G6}$ and $V_{G7}$ can be configured as PWM signal PWMB to control the operation of power switches Q6 and Q7. Power switches Q5-Q8 of the third and fourth half bridge circuits can form a full bridge inverter circuit to convert a DC current at the input terminals to an AC current at output ports AC3 and AC4 to drive transmitter coupling circuit 13. Substantially simultaneously, power switches Q1 and Q3 of the first and second half bridge circuits can be controlled by PWM signal PWMA, and power switches Q2 and Q4 may be controlled by PWM signal PWMB. Power switches Q1 and Q3 can be controlled to be simultaneously turned on or off, and power switches Q2 and Q4 may be controlled to be simultaneously turned on or off. Therefore, no AC current may be output from the first and second half bridge circuits, and from the second and third half bridge circuits. Also, AC current may only be generated at the output ports AC3 and AC4 of inverter circuit 12 by control circuit 14 to drive the third transmitter coupling circuit.

The switching operations of power switches of inverter circuit 12 may be controlled by different PWM signals in order to maintain that only one transmitter coupling circuit is driven in one time interval. Several transmitter coupling circuits can be controlled to be operated in turn to provide power to loads, or controlled to drive one more specific transmitter coupling circuits, or controlled to enable one or more specific transmitter coupling circuits. In this particular example, the operation of transmitter coupling circuit 13 may be similar to that of the first example as described above. In this particular example, impedance conversion network 15 can be included between output ports of inverter circuit 12 and transmitter coupling circuit 13 correspondingly to each of transmitter coupling circuit 13.

Electrical energy receiver 2 can include receiver coupling circuit 21, rectifier circuit 22, power converter 23, and communication circuit 24, which is configured to drive LED load(s) 3 based on the received electrical energy. Receiver coupling circuit 21 can be coupled to transmitter coupling circuit 13 in a contactless mode by electromagnetic induction or resonance mode, in order to output high frequency AC current based on received electrical energy. Rectifier circuit 22 can convert AC current to DC current.

Power converter 23 can connect between rectifier circuit 22 and LED load 3 to achieve DC to DC conversion, which can be configured as switching power converters or linear regulators as shown in FIG. 2A. In this example, a linear regulator is configured to provide constant current to LED load(s) 3. In FIG. 2A, when the received electrical energy is changed, the voltage of power converter 23 can also be changed. Therefore, output voltage of power converter 23 may be configured as the feedback signal representing a voltage of LED load 3.

Communication circuit 24 can be configured to transfer the information of the feedback signal to transmitter 1 based on a short distance wireless communication protocol (e.g., Bluetooth protocol, infrared communication protocol, etc.). In this example, communication circuit 24 can also receive enable timing signal, and power converter 23 can be controlled to be in operation or out of operation according to the enable timing signal. When power converter 23 is out of operation, no electrical energy may be provided to load.

Figure 2C:
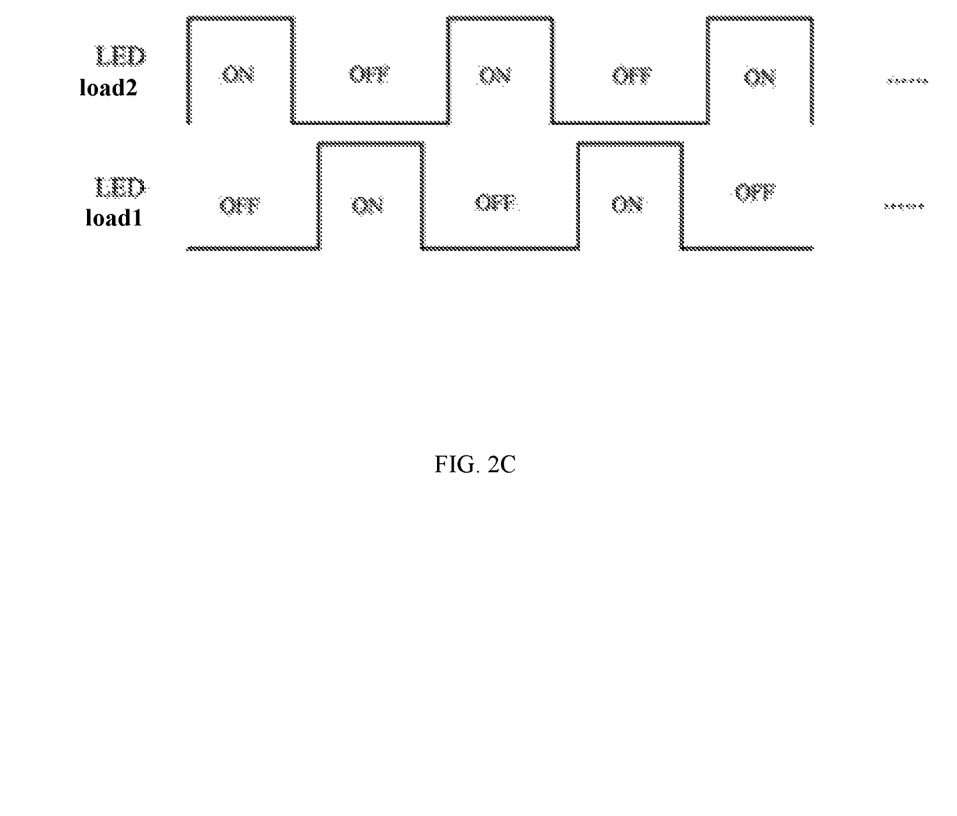
FIG. 2C is a waveform diagram of example enable timing signals for the example of FIG. 2A, in accordance with embodiments of the present invention.

Referring now to FIG. 2C, shown is a waveform diagram of example enable timing signals for the example of FIG. 2A, in accordance with embodiments of the present invention. When the enable timing signal is active "ON", power converter 223 may be in operation (enabled). When the enable timing signal is inactive "OFF", power converter 223 may be out of operation (disabled). When the number of electrical energy receivers 2 is equal to 2, the enable timing signals of the two electrical energy receivers are complementary as shown in FIG. 2C; therefore, the two electrical energy receivers 2 can be operated in turn.

In this particular example, each of electrical energy receivers 2 is controlled to receive electrical energy in different time intervals. In each time interval, only one electrical energy receiver may be configured to provide power to corresponding LED load 3. In operation, the output signal (e.g., output voltage of power converter 11) can be regulated by control circuit 14 in accordance with a corresponding feedback signal of power converter 23. Thus, the power provided to LED load 3 may be correspondingly regulated to be consistent with (e.g., the same as) a predetermined value, in order to achieve a higher efficiency. Also, power provided to transmitter coupling circuit 13 can be regulated by regulating the parameters of inverter circuit 12 (e.g., switching frequency, working time, etc.) in order to regulate the power provided to LED load 3. Furthermore, both power converter 11 and inverter circuit 12 can be regulated simultaneously in order to achieve the control to the power provided to LED load 3.

In particular embodiments, a plurality of transmitter coupling circuits can be arranged and configured to provide power to corresponding electrical energy receivers 2 in turn to drive LED loads 3. Further, when the transmitter coupling circuit is coupled to a plurality of receiver coupling circuits, in the time interval that the current transmitter coupling circuit is in operation, by the control of enable timing signal, the electrical energy receivers can be controlled to be in operation in turn. Therefore, only one electrical energy receiver can be configured to provide power to LED load 3 based on received energy from the transmitter coupling circuit. Furthermore, the first power converter (e.g., 11) can be regulated by control circuit 14 to accurately control the output power of the electrical energy receiver 2 to regulate the power provided to LED load 3. As one skilled in the art will recognize, as shown in FIG. 2A, a plurality of transmitter coupling circuits are employed operated in turn; however, the number of transmitter coupling circuits can also be set to be one in this case.

Figure 3A:
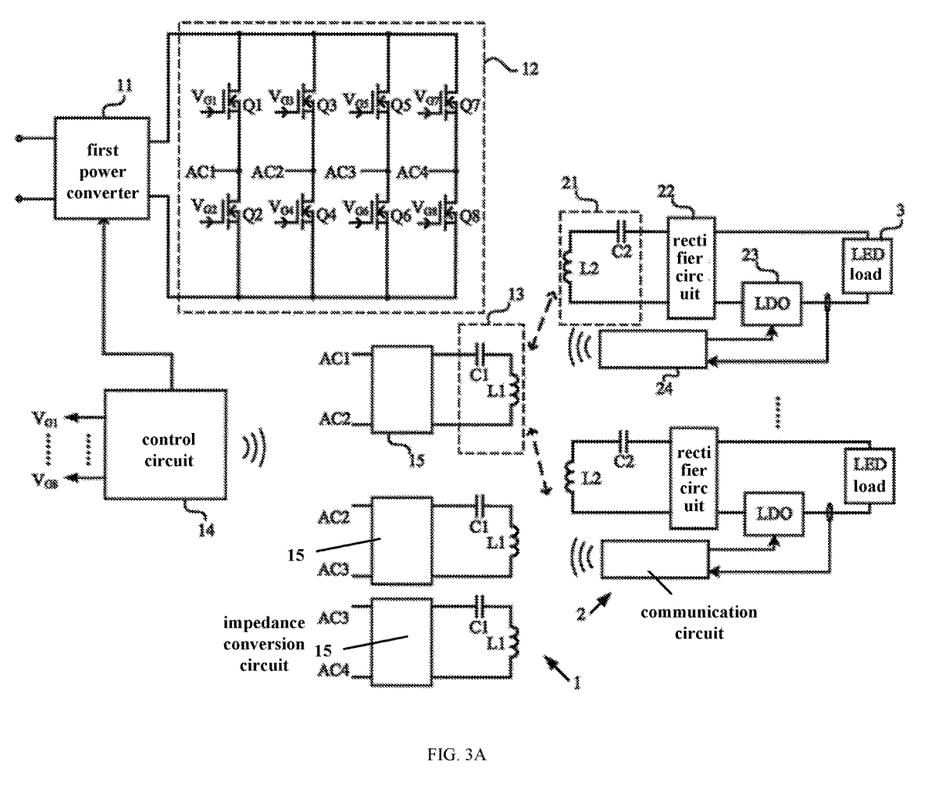
FIG. 3A is a schematic block diagram of a third example wireless LED driver, in accordance with embodiments of the present invention.

Referring now to FIG. 3A, shown is a schematic block diagram of a third example wireless LED driver, in accordance with embodiments of the present invention. In this particular example, the wireless LED driver can include one electrical energy transmitter 1, and at least one electrical energy receiver 2 coupled to the electrical energy transmitter 1 in a contactless mode. Also, LED load(s) 3 can be coupled to electrical energy receivers 2 to receive electrical energy from electrical energy transmitter 1 in a contactless mode. Electrical energy receivers 2 can include receiver coupling circuit 21, rectifier circuit 22, power converter 23, and communication circuit 24. In particular embodiments, power converter 23 can be configured as a constant voltage converter to maintain output voltage to be substantially constant.

The output current information, that is the driving current flowing through LED load 3, can be feedback to control circuit 14 through communication circuit 24 in a contactless mode. In addition, an enable timing signal generated according to the output current information is transferred to communication circuit 24. Power converter 23 can be controlled to be in operation (enabled) or out of operation (disabled) according to the enable timing signal to make the output current of each power converter 23 to be consistent. For example, when there are two electrical energy receivers 2, the enable timing signal can be determined as per the following formula (1):

$$D_{LED2}*I_{LED1}=D_{LED2}*I_{LED2} \quad (1)$$

Here, $I_{LED1}$ and $I_{LED2}$ may represent the output current of the two electrical energy receivers, and $D_{LED1}$ and $D_{LED2}$ may represent the duty cycle of the enable timing signals for the two electrical energy receivers, that is the ratio between the on time and the switching period.

Figure 3B:
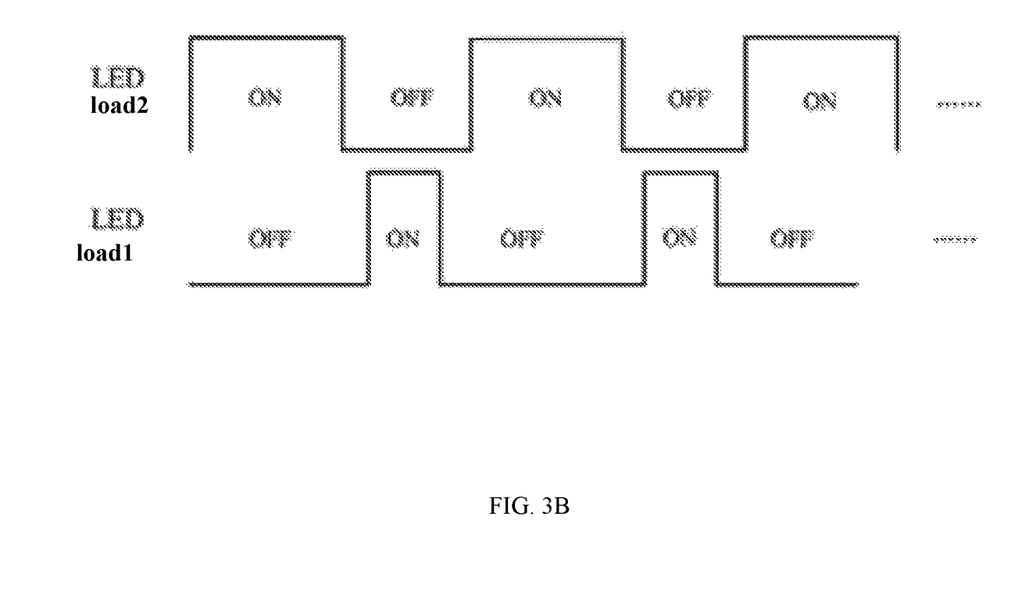
FIG. 3B is a waveform diagram of example enable timing signals for the example of FIG. 3A, in accordance with embodiments of the present invention.

Referring now to FIG. 3B, shown is a waveform diagram of example enable timing signals for the example of FIG. 3A, in accordance with embodiments of the present invention. In one switching period, the on time interval can be the two electrical energy receivers can be same or not the same. The longer the on time interval is, the higher the received electrical energy is to increase the output current. When the output current is smaller, the on time interval is longer. Similarly, the shorter the on time interval is, the lower received electrical energy is to decrease the output current. When the output current is larger, the on time interval is shorter. Therefore, constant output current can be achieved.

In particular embodiments, a plurality of transmitter coupling circuits can be arranged and configured to provide power to corresponding electrical energy receivers 2 in turn to drive LED load(s) 3. When the transmitter coupling circuit is coupled to a plurality of receiver coupling circuits, in the time interval that the current transmitter coupling circuit is in operation, and by the control of enable timing signal, the electrical energy receivers can be controlled to be in operation in turn. Therefore, only one electrical energy receiver can be configured to provide power to LED load 3 based on the received energy from the transmitter coupling circuit. Furthermore, the first power converter can be regulated by control circuit 14 to accurately control the output power of the electrical energy receiver 2 to regulate the power provided to LED load 3. While in the example as shown in FIG. 3A, a plurality of transmitter coupling circuits are employed operated in turn; however, the number of transmitter coupling circuits can also be set to be one in this case.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A wireless light-emitting diode (LED) driver, comprising:
   a) an electrical energy transmitter comprising an inverter circuit coupled to receive an input power supply, and being configured to convert a received voltage signal to an AC signal;
   b) said electrical energy transmitter comprising N transmitter coupling circuits coupled to said inverter circuit, and being configured to be driven by said AC signal;
   c) an electrical energy receiver comprising M receiver coupling circuits coupled to said transmitter coupling circuits in a contactless mode, and being configured to receive said AC signal; and
   d) said electrical energy receiver comprising M rectifier circuits coupled to said receiver coupling circuits one by one, wherein each said rectifier circuit is configured to convert said AC signal to a DC signal to drive an LED load coupled to output terminals of said rectifier circuit, and wherein N and M are integers not less than 1.

2. The wireless LED driver of claim 1, wherein said electrical energy receiver further comprises M power converters, each said power converter being coupled between said output terminals of said rectifier circuits and said LED load, and being configured to generate a constant driving current to drive said LED load.

3. The wireless LED driver of claim 2, wherein said power converter is configured as a linear regulator.

4. The wireless LED driver of claim 2, wherein said power converter is configured as a switching power regulator.

5. The wireless LED driver of claim 1, wherein said inverter circuit is configured as a half bridge inverter circuit.

6. The wireless LED driver of claim 1, wherein said inverter circuit is configured as a full bridge inverter circuit.

7. The wireless LED driver of claim 1, wherein said inverter circuit is configured as a compound half bridge inverter circuit having at least three half bridge circuits.

8. The wireless LED driver of claim 1, wherein said electrical energy transmitter further comprises a power converter coupled between said input power supply and said inverter circuit, and being configured to convert said input voltage.

9. The wireless LED driver of claim 1, wherein said electrical energy transmitter further comprises impedance conversion networks coupled between said inverter circuit and said transmitter coupling circuits to achieve impedance matching and impedance conversion performance.

10. The wireless LED driver of claim 1, wherein said wireless LED driver further comprises a communication circuit configured to transfer a feedback signal representing driving current flowing through said LED load in a contactless communication mode.

11. The wireless LED driver of claim 10, wherein said wireless LED driver further comprises a control circuit configured to control the operation of a power converter and/or said inverter circuit in accordance with said feedback signal and a reference signal to maintain said driving current to be consistent with a predetermined value.

12. The wireless LED driver of claim 1, wherein said wireless LED driver further comprises communication circuits, each said communication circuit being configured to transfer a feedback signal that represents a driving voltage of one of said LED loads in a contactless communication mode.

13. The wireless LED driver of claim 12, wherein said wireless LED driver further comprises a control circuit configured to control the operation of a power converter and/or said inverter circuit in accordance with a minimum value of said feedback signals to control the value of said driving voltages to achieve higher efficiency.

14. The wireless LED driver of claim 2, wherein:
a) said M power converters are controlled by enable signals to regulate the average current flowing through said LED loads;
b) said M power converters are in operation when said enable signals are active; and
c) said M power converters are out of operation when said enable signals are inactive.

15. The wireless LED driver of claim 1, wherein said transmitter coupling circuit is configured to one or more said receiver coupling circuits.

16. The wireless LED driver of claim 7, wherein output terminals of two of said half bridge circuits are coupled to drive corresponding one of said transmitter coupling circuits.

17. The wireless LED driver of claim 16, wherein said transmitter coupling circuits are controlled to be operated in turn by controlling the operation of said compound half bridge inverter circuit.

* * * * *